Jan. 28, 1941. G. M. MAGRUM 2,229,660

HYDRAULIC SHOCK ABSORBER

Original Filed June 10, 1938

Inventor
GERVASE M. MAGRUM.
by Charles Allen
Attys.

Patented Jan. 28, 1941

2,229,660

UNITED STATES PATENT OFFICE 2,229,660

HYDRAULIC SHOCK ABSORBER

Gervase M. Magrum, Buffalo, N. Y., assignor to Houde Engineering Corporation, Buffalo, N. Y., a corporation of New York Original application June 10, 1938, Serial No. 212,867. Divided and this application January 8, 1940, Serial No. 312,841

1 Claim. (Cl. 188—89)

This application is a division of my copending application Serial No. 212,867, filed June 10, 1938, and is filed to cover the hydraulic shock absorber structure per se disclosed in said pending application.

Where a hydraulic shock absorber is employed for service on airplanes, or in other installations, it is very important that the hydraulic working chambers should at all times be kept fully filled with hydraulic fluid in order that the shock absorber may at all times be in the proper hydraulic condition for efficiently performing its shock absorbing or dampening service. It is therefore the important object of this invention to produce an efficient hydraulic shock absorber for this class of service.

An important feature of the invention is the provision of a fluid reservoir or replenishing chamber in which the fluid is at all times kept under pressure, as by spring means, so that, no matter what position the shock absorber may assume during service, there will be no chance for any drainage of hydraulic fluid from the hydraulic working chambers, but these chambers will be at all times kept filled with the fluid so that the shock absorber may function efficiently to perform the service for which it is intended.

The various features of the invention are incorporated in the structure shown on the drawing, in which drawing.

Figure 1:
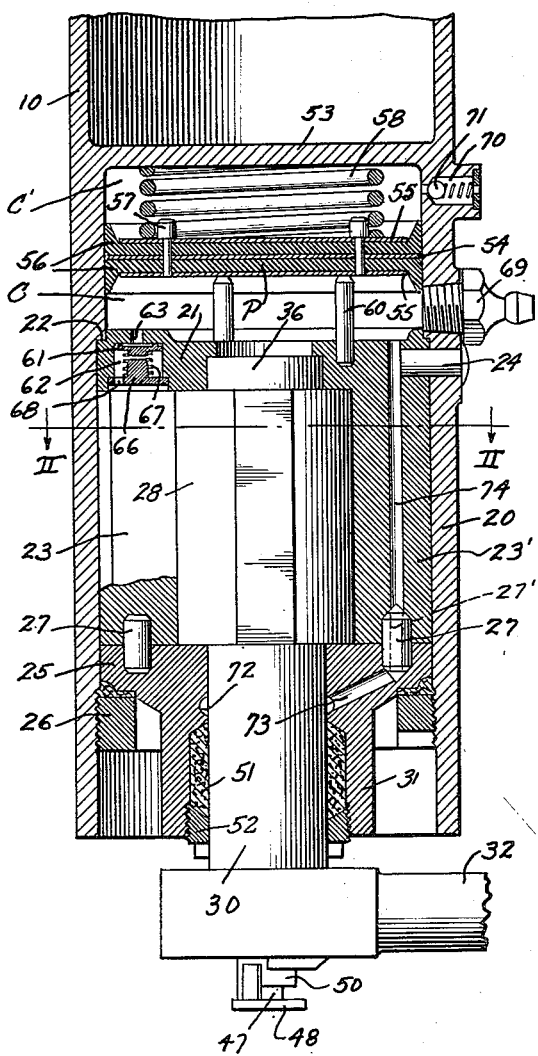
Figure 1 is a longitudinal diametral section of a shock absorber.
Figure 3:
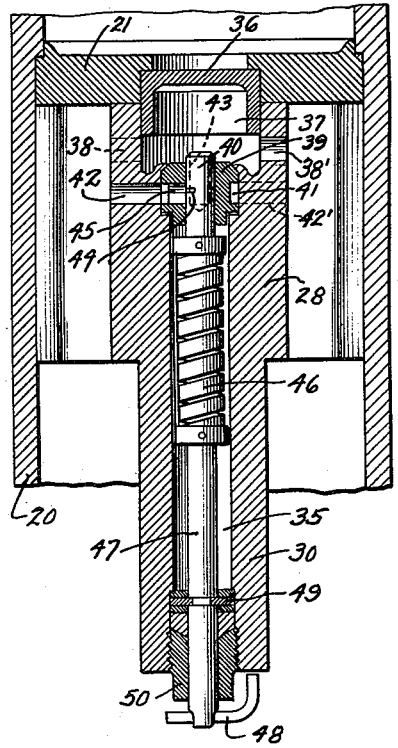
Figure 3 is a section on plane III—III of Figure 2.
Figure 2:
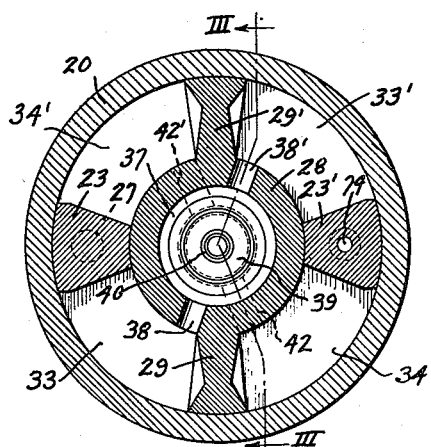
Figure 2 is a section on plane II—II of Figure 1.

The shock absorber shown is of the so-called rotary type and comprises a cylinder wall 20 within which there is an inner cross wall 21 which seats against a shoulder 22 provided within the wall 20, and from the cross wall diametrally opposite hydraulic abutments or partition walls 23 and 23' extend, and, as shown, these abutment walls may be integral with the cross wall 21. One or more pins 24 extend through the wall 20 into the wall 21 for locking the walls together.

The outer cross wall 25 fits into the cylinder wall 20 and abuts the outer ends of the partition walls 23 and 23', and a clamping ring 26 having threaded engagement with the wall 20 securely clamps the outer wall 25 against the partition walls and holds the inner wall 21 against the seat 22. Pins 27 will lock the outer wall 25 against rotary displacement relative to the partition walls 23 and 23'.

The walls 20, 21, and 25 define a cylinder space for the hydraulic working fluid into which space the partition walls 23 and 23' project radially. Within the cylinder space is the cylindrical hub 28 of the piston structure, the hub bearing against the inner faces of the partition walls and having oppositely extending piston vanes 29 and 29' thereon which engage with the cylindrical inner surface of the wall 20 between the partition walls. The piston shaft 30 extends from the hub 28 through the outer wall 25 and the bearing extension 31 thereon, the outer end of the shaft having secured thereto an arm 32. In service the shock absorber will be interposed between two relatively movable elements, and the lever 32 may connect with one of such elements. The cylinder 20 is provided with suitable means for mounting it on the other of the elements between which the shock absorber is disposed. Where the shock absorber is supported on an airplane, the cylinder support may be in the form of a strut 10 extending from the shock absorber, and as disclosed in my copending application referred to hereinbefore, the cylinder wall may be the lower end of the tubular strut which is rotatable, and the piston shaft arm 32 is held stationary so that the strut with the cylinder thereon will rotate relative to the piston structure. In other installations the cylinder may be stationarily mounted and the piston shaft arm connected to swing so that the piston structure will rotate relative to the cylinder.

The piston hub with its vanes and the partitions 23 and 23' divide the cylinder space into the diagonally opposite hydraulic working chambers 33 and 33' and the diagonally opposite working chambers 34 and 34'. The piston shaft and its hub have the bore 35 extending therethrough, the inner end of which bore is enlarged to receive the bearing plug 36 seated in the wall 21, the plug being hollow and with the enlarged bore end forming a chamber 37 which communicates with the working chambers 33 and 33' through the passages 38 and 38' respectively extending through the piston hub.

Adjacent to the chamber 37, a seat bushing 39 is secured in the bore 35, the bushing being bored to receive the cylindrical valve plug 40. The seat bushing has the circumferential channel 41 communicating with the working chambers 34 and 34' through passages 42 and 42' in the piston hub.

At its inner end the valve plug 40 has the passageway or bore 43 therethrough communicating with the chamber 37, and the valve plug has the circumferentially extending slit 44 communicating with the passageway 45 between the seat bushing channel 41 and the bushing bore in which the valve plug seats the circumferential extent of overlap of the passageway 45 by the orifice slit 44 determining the resistance to the fluid flow between the shock absorbing hydraulic chambers. During relative movement of the cylinder and piston structures in one direction, the displaced fluid will flow from the working chambers 33 and 33' through the ports 38 and 38' into the chamber 37 and then through the valve plug and the exposed part of the orifice slit 44 into the passageway 45 and the channel 41 in the seat bushing, and from there through the ports 42 and 42' into the working chambers 34 and 34'. Upon relative rotation in the opposite direction, the flow of the displaced fluid will be in reverse direction through the path just traced, the resistance to such flow and therefore the hydraulic control being determined by the size of the orifice passageway presented by the orifice slit 44.

I have shown a thermostat coil 46 secured at its inner end to the valve plug and at its outer end to the stem 47 which extends through the piston shaft bore to the exterior thereof and there provided with a lever 48 whereby the stem structure may be manually adjusted for the desired degree of exposure of the orifice slit and the desired shock absorbing resistance. After manual setting of the valve, the thermostat coil will respond to temperature change within the shock absorber structure so that the orifice exposure will be thermostatically adjusted to compensate for change in viscosity of the hydraulic fluid due to temperature change.

As shown, a suitable guide washer or collar structure 49 is clamped in the bore 35 by a plug 50 for holding the stem 47 against movement after manual rotation thereof for adjustment for orifice size. The outer end of the piston shaft extending through the bearing extension 31 has packing material 51 applied thereto by a gland 52, the packing tending to prevent leakage of hydraulic outwardly along the shaft.

During service of the shock absorber, as when installed on airplanes, it will assume various angular positions or even full inverted positions, and it is therefore important that the working chambers be kept at all times properly filled with hydraulic fluid and any drainage therefrom prevented so that the shock absorber may efficiently function. To accomplish this I provide fluid control and replenishing structure comprising a replenishing chamber proper and a replenishing compensating chamber. Referring to Figure 1, the cylinder head 53 and the cross wall 21 define a cylindrical space within which operates a plunger or piston structure P. As shown, this structure may comprise an inner plate 54 and outer plates 55 between which cup washers 56 are clamped as by rivets 57, the cup washers being of leather or other suitable material. A compression spring 58 is interposed between the washer or piston structure and the cylinder head, and the rivets 57 may have enlarged heads to be surrounded by the spring so as to keep the spring axially aligned. Extending upwardly from the shock absorber inner wall 21 are a number of stop pins 60 which limit the inward movement of the plunger structure P. The space between the plunger structure and the wall 21 constitutes the replenishing chamber proper C, while the space between the plunger structure and the cylinder head 53 constitutes the replenishing compensating chamber C'.

For controlling the flow of replenishing fluid from the chamber C to the shock absorber working chamber, check valves 61 are provided. In the wall 21, valve chambers 62 are provided adjacent to and at opposite sides of one of the partition walls, as for example the partition wall 23, and a port 63 connects each valve chamber with the replenishing chamber C. Each valve 61 is normally held closed by a spring 67 interposed between the valve and an abutment plug 66 in the valve chamber, the plug having a passageway 68.

A filler plug 69 is provided for the replenishing chamber C, this plug being of any well known leak proof and pressure type so that hydraulic fluid may be forced therethrough under pressure into the chamber C. When such fluid is forced into the chamber C under pressure, the plunger structure P will be shifted outwardly against the resistance of the spring 58, and then after the chamber C has been filled with fluid, the spring will tend to shift the plunger inwardly so that the chamber C will be kept filled at all times with fluid under pressure no matter what position the shock absorber may assume. The check valves 61 will be kept closed by the pressure in the hydraulic working chambers, but under suction in these chambers they will open for flow of fluid from the replenishing chamber C to the working chambers, in case the working chambers are not completely filled. If the replenishing chamber C were not kept filled at all times, and the shock absorber should be tilted or inverted while it is in operation, air would be sucked into the working chambers instead of replenishing fluid and the shock absorber would then be unable to properly function.

The replenishing compensating chamber C' does not receive fluid when the chamber C is charged with fluid under pressure, but the chamber C' is provided with an outlet 70 controlled by a check valve 71, through which outlet air may escape from the chamber C' while the chamber C is being filled with fluid. Any fluid or any air which may leak past the plunger structure P into the chamber C' will therefore be expelled through the outlet 70 so that the structure P may properly function. Should fluid leakage from the shock absorber structure take place, the plunger structure P will be moved inwardly by the spring 58 to compensate for the leakage and maintain the fluid pressure within the shock absorber, and when the plunger structure P reaches the stop pins 60, the chamber C will have to be given another charge of fluid.

I have shown a fluid intercepting channel 72 in the bearing wall 25 for the shock absorber piston shaft and a passageway for returning any intercepted leakage fluid to the reservoir or replenishing chamber C. This passageway includes the passage 73 in the wall 25, the bore 27' of one of the pins 27, and the passage 74 through the corresponding partition wall 23'. Any fluid which may be forced out of the working chambers and along the piston shaft is thus intercepted and returned to the replenishing chamber.

I thus provide an improved hydraulic shock absorber in which the proper hydraulic fluid supply is maintained at all times no matter what position the shock absorber may assume, so that the shock absorber may function efficiently under all service conditions.

I do not desire to be limited to the exact construction, arrangement, and operation shown and described, as changes and modifications are possible which would still come within the scope of the invention.

I claim as follows:

A hydraulic shock absorber structure comprising an outer cylindrical wall, an inner cross wall for said cylindrical wall, an intermediate and an outer cross wall for said cylindrical wall defining therewith a hydraulic working space, a piston structure within said working space and a shaft extending therefrom through the outer cross wall, said cylinder wall and said piston structure being relatively rotatable for displacement of fluid in said working space, adjustable means for controlling the flow of the displaced fluid whereby to dampen said relative movement, an imperforate plunger structure shiftable in the cylindrical space defined by said cylindrical wall and said inner and intermediate cross walls and dividing said cylindrical space into a fluid replenishing chamber adjacent to said intermediate wall and a compensating replenishing chamber adjacent to said inner cross wall, a spring interposed between said plunger structure and said inner cross wall, an inlet to said replenishing chamber from the exterior thereof for charging fluid under pressure into said replenishing chamber, said pressure shifting said plunger structure outwardly to put said spring under tension and whereby said spring will tend to shift the plunger structure toward said intermediate cross wall, check valve controlled passageways through said intermediate cross wall for flow of fluid from the replenishing chamber into said working space and whereby the pressure against the fluid in the replenishing chamber will keep the working space filled with fluid independently of the position of the shock absorber structure, and a valve controlled relief outlet from said replenishing compensating chamber to the exterior thereof.

GERVASE M. MAGRUM.